United States Patent
Scharf et al.

(10) Patent No.: US 8,520,891 B2
(45) Date of Patent: Aug. 27, 2013

(54) METHOD OF PREDICTING CROP YIELD LOSS DUE TO N-DEFICIENCY

(75) Inventors: Peter Clifton Scharf, Columbia, MO (US); Victoria Cacnio Hubbard, Rolla, MO (US)

(73) Assignee: The Curators of the University of Missouri, Columbia, MO (US)

( * ) Notice: Subject to any disclaimer, the term of this patent is extended or adjusted under 35 U.S.C. 154(b) by 0 days.

(21) Appl. No.: 13/481,245

(22) Filed: May 25, 2012

(65) Prior Publication Data

US 2012/0250962 A1 Oct. 4, 2012

Related U.S. Application Data

(62) Division of application No. 11/936,564, filed on Nov. 7, 2007, now Pat. No. 8,208,680.

(60) Provisional application No. 60/857,242, filed on Nov. 7, 2006.

(51) Int. Cl.
*G06K 9/00* (2006.01)

(52) U.S. Cl.
USPC .......................................................... 382/100

(58) Field of Classification Search
USPC ......... 382/100, 109, 110; 73/152.01–152.15; 348/85–95; 356/241.1–241.6
See application file for complete search history.

(56) References Cited

U.S. PATENT DOCUMENTS

| | | | |
|---|---|---|---|
| 5,764,819 A | 6/1998 | Orr et al. | |
| 6,160,902 A * | 12/2000 | Dickson et al. | 382/110 |
| 6,529,615 B2 | 3/2003 | Hendrickson et al. | |
| 6,683,970 B1 | 1/2004 | Satake et al. | |
| 6,813,544 B2 | 11/2004 | Hood et al. | |
| 7,103,451 B2 | 9/2006 | Seal et al. | |
| 7,184,859 B2 | 2/2007 | Hood et al. | |
| 8,208,680 B2 | 6/2012 | Scharf et al. | |
| 2001/0016053 A1 | 8/2001 | Dickson et al. | |
| 2001/0036295 A1 | 11/2001 | Hendrickson et al. | |
| 2008/0304711 A1 | 12/2008 | Scharf et al. | |

OTHER PUBLICATIONS

Bausch et al., "Remote Sensing of Plant Nitrogen Status in Corn", American Society of Agricultural Engineers, 1996, pp. 1869-1875, vol. 39, No. 5.

(Continued)

*Primary Examiner* — Atiba O Fitzpatrick
(74) *Attorney, Agent, or Firm* — Polsinelli PC

(57) ABSTRACT

A method for determining the yield loss of a crop using remote sensor data is described. The yield loss is determined using the reflectivity of green light by the crop canopy measured from remote sensor data such as an aerial photograph that is digitized and spatially referenced to the field's longitude and latitude. Green pixel values from the aerial photograph, expressed relative to green pixel values from well-fertilized areas of the field, are transformed to yield losses using a linear transformation that was developed using empirical data. A similar method is described to determine recommended nitrogen fertilization rates for the crop fields. The yield loss data is useful for nitrogen fertilization management, as it allows a producer of crops to weigh the expense of fertilization against the loss of revenue due to yield loss.

3 Claims, 6 Drawing Sheets

(56) References Cited

OTHER PUBLICATIONS

Binder et al., "Maize Response to Time of Nitrogen Application as Affected by Level of Nitrogen Deficiency", Agronomy Journal, 2000, pp. 1228-1236, vol. 92.

Blackmer et al., "Analysis of Aerial Photography for Nitrogen Stress within Corn Fields", Agronomy Journal, 1996, pp. 729-733, vol. 88.

Blackmer et al., "Light Reflectance Compared with Other Nitrogen Stress Measurements in Corn Leaves", Agronomy Journal, 1994, pp. 934-938, vol. 86.

Clay et al., "Characterizing Water and Nitrogen Stress in Corn Using Remote Sensing", Agronomy Journal, 2006, pp. 579-587, vol. 98.

Ritchie et al., "How a Corn Plant Develops", Iowa State University, Special Report No. 48, Jun. 1993, 22 pgs.

Scharf et al., "Calibrating Corn Color from Aerial Photographs to Predict Sidedress Nitrogen Need", Agronomy Journal, 2002, pp. 397-404, vol. 94.

Scharf et al., "Corn Yield Response to Nitrogen Fertilizer Timing and Deficiency Level", Agronomy Journal, 2002, pp. 435-441, vol. 94.

Scharf et al., "Field-Scale Variability in Optimal Nitrogen Fertilizer Rate for Corn", Agronomy Journal, 2005, pp. 452-461, vol. 97.

Sripada et al., "Aerial Color Infrared Photography for Determining Late-Season Nitrogen Requirements in Corn", Agronomy Journal, 2005, pp. 1443-1451, vol. 97.

Office Action from related U.S. Appl. No. 11/936,564, dated Sep. 27, 2011, 16 pgs.

Notice of Allowance and Fee(s) Due from related, U.S. Appl. No. 11/936,564, dated Feb. 24, 2012, 13 pgs.

* cited by examiner

METHOD OF PREDICTING CROP YIELD LOSS DUE TO N-DEFICIENCY

CROSS-REFERENCE TO RELATED APPLICATION

This application is a Divisional Application of Non-Provisional application Ser. No. 11/936,564 filed on Nov. 7, 2007, which claims priority from Provisional Application Ser. No. 60/857,242 filed on Nov. 7, 2006, all of which are hereby incorporated by reference in their entirety.

FUNDING OF RESEARCH

This work was supported by the U.S. Environmental Protection Agency contract number X-98756601-0. The U.S. government has certain rights in this invention.

FIELD

The present invention is directed generally to methods for determining the health and yield of a crop, using remote sensing data such as aerial photographs. In particular, the present invention provides a method of determining optimal nitrogen application rates as well as predicted losses in crop yield due to nitrogen deficiency.

BACKGROUND

Loss of nitrogen can result in economic loss in crop production systems due to nitrogen deficiency and yield limitation. Nitrogen is susceptible to loss from soils by a variety of mechanisms. The nitrate form of nitrogen is prone to loss by either leaching or denitrification when soils are wet. Nitrogen losses associated with wet soil conditions are common types of nitrogen loss from agricultural soils. The magnitude of nitrogen loss, and the process by which the nitrogen is lost, depends strongly on soil temperature and soil hydrology. Variations in soil temperature and hydrology within a field, due to differences in microclimate, can lead to substantial spatial variability in the amount of nitrogen that is lost within a given field.

When nitrogen loss occurs after the application of nitrogen fertilizer, a likely outcome, in the absence of any further intervention, is that the crop will suffer from nitrogen deficiency, resulting in substantial yield loss and subsequent economic loss. The yields of many crops, including corn, rice, wheat, and potatoes, dramatically increase in response to nitrogen applications throughout the vegetative stages of growth.

A traditional approach to avoiding losses in crop yield due to nitrogen deficiency is to apply an excess of nitrogen fertilizer at planting to compensate for anticipated nitrogen losses due to leaching or other mechanisms. An alternative and arguably more efficient approach to a single sizable application of nitrogen fertilizer near planting is the practice of applying a low nitrogen fertilizer rate at planting, which may be fully or partially corrected by an additional nitrogen application as needed in midseason. A corn producer, for example, may apply a low nitrogen rate near planting, and then apply additional nitrogen through a pivot irrigation system at growth stage V9 or later (Ritchie et al. 1993). Because the need for nitrogen is often spatially variable, accurate spatial diagnosis of nitrogen status can reduce the over-application of fertilizer, groundwater contamination, and can also increase nitrogen use efficiency, resulting in reduced operating costs. Thus, applying nitrogen to the growing crop, referred to in the art as rescue nitrogen application, is an effective way to respond to loss of fertilizer nitrogen.

Rescue nitrogen applications for corn and other crops are typically more expensive than primary nitrogen applications due to the height of the crops at the time the rescue nitrogen is applied, which usually create a need for specialized high-clearance equipment or aerial applications of nitrogen. The availability of equipment for high-clearance or aerial applications is often limited, meaning that it takes considerable effort on the part of a corn producer to arrange for these nitrogen applications. Balancing the cost and inconvenience of rescue nitrogen application against the economic impact of anticipated yield loss would help producers to make sound decisions about whether to proceed with rescue nitrogen applications.

Traditional technologies and methods for measuring leaching and denitrification losses of nitrogen are difficult and expensive, which limit a producer's ability to predict nitrogen loss and to utilize rescue nitrogen fertilization in order to minimize the potential yield loss for a particular field or section of a field. The soil may be periodically tested for nitrogen content at different depths and locations throughout the fields of a farm. Crop information may also be obtained using an apparatus in which the light with a wavelength related to crop nitrogen content is irradiated on a leaf blade of the crop and based on the reflectivity of the leaf at this wavelength of light, the leaf blade nitrogen content is measured with high precision. However, each of these techniques of monitoring soil and crop nitrogen content are highly localized. In order to determine the crop information accurately for the overall field, as well as to obtain an accurate mapping of the spatial variation of the crop information, numerous repeats of the minute measurements described above are required. Obtaining crop information in this manner is time-consuming, labor intensive, expensive, and may not supply the information in time for the farmer to apply rescue nitrogen effectively.

The increasing availability of commercial remote-sensing services tailored to the needs of agriculture offers new opportunities to develop and improve rescue nitrogen management strategies. Several studies have evaluated remote sensing techniques to determine corn nitrogen status during the growing season and have determined that the reflectance of corn near the 550 nm green visible band is significantly correlated with leaf nitrogen concentration or other variables related to crop nitrogen status, and therefore can be used to detect nitrogen deficiencies in crop canopy. Particularly, nitrogen-deficient corn reflects more visible light than nitrogen-sufficient corn, which suggests that light reflectance can be quantitatively related to the amount of nitrogen stress experienced by the crop.

The specific relationship between crop reflectivity and nitrogen status has been developed to some extent, but no specific or general relationships for predicting nitrogen loss or yield loss from remotely sensed data have been developed. To date, this relationship has been determined by adding increasing quantities of nitrogen to a system that is nitrogen-limited. For application to nitrogen loss situations, it is more appropriate to define the relationship between color, nitrogen stress, and yield in the context of a fully fertilized crop that experiences a range of nitrogen losses. The resulting relationship between nitrogen stress (as measured by crop color) and yield loss most directly addresses the question that is most salient to the producer: does it make good business sense to apply rescue nitrogen fertilization to my nitrogen-stressed crops, or does the cost of fertilization outweigh the gain in crop yield?

Remote sensing using aerial and satellite photography as well as ground-based sensors have been used to determine several parameters related to the successful cultivation of crops, including soil nutrient content, chlorophyll content of crop leaves, and nitrogen content of crop leaves. The factors measured using remote sensing are correlated with the overall health and nutrient status of the crops. In general, these methods rely on variations in the reflectivity of the soil or the crop canopy to selected wavelengths of light falling within the visible and the near-infrared spectrum. Soil nitrogen content is correlated with the soil's reflectivity of infrared light, and crop nitrogen content is associated with increased reflectivity of the leaves in the crop canopy to visible light. This increased reflectance of nitrogen-rich plant leaves is most pronounced within the green wavelengths of the visible light spectrum.

Most cameras used for the remote sensing of crops record a three-spectral image combining either the near infrared, red, and green wavelengths or the red, green, and blue wavelengths. Remote sensing methodologies used for the determination of crop nitrogen status generally process the intensity of the colors, in particular the green contained in each pixel of a digital image of a field, and determines the variation in the intensity of each color. In order to minimize the confounding effects of spatial and temporal variations in camera angle, altitude, camera focal length, and ambient lighting, many remote sensing methods determine changes in pixel colors relative to the colors of other pixels in the field. By combining the relative intensity of green in each pixel with measured coordinates that determine the spatial distribution of the pixels, a relative greenness map may be developed.

Previous methods have used the relative greenness map to make determinations about the health of the crops, and in some cases may determine an optimal nitrogen fertilization rate that results in crops that are supplied with exactly the amount of supplemental nitrogen necessary to optimize crop health and yield. However, optimizing the growth and harvest of the crops is only half of the information necessary for a producer to manage the growth and care of crops. When managing the production of crops, the producer must constantly weigh the cost of additional nitrogen fertilization against the potential increase in revenue from the sale of the additional crop yield. To date, current field management methodologies that utilize remote sensing lack the capability to determine the impact of variations in the health and nutritional status of crop plants on the crop yield.

At the present time, there exists an unmet need to determine the impact of crop nutrient status on the resulting crop yield using remote sensing technology such as aerial photographs. The results of this method would make it possible for the producer to manage the nitrogen supplementation of the crops informed by the economic impact of any nitrogen deficiency on crop yield.

SUMMARY

The present invention describes a novel method of determining nutrient deficiency and resulting crop yield loss using aerial photographs and positional data. In particular, the invention describes a method of determining the yield loss of a crop, such as corn due to nitrogen-deficiency using aerial photographs. The inventive method includes several steps comprising: obtaining aerial images of a field of interest, assigning spatial coordinates to one or more aerial images of a field or fields of interest, establishing a reference value of green ($G_{ref}$) that represents the appearance of the corn canopy with sufficient nitrogen fertilization, calculating a Relative Green (RG) value of each pixel or polygon by dividing the value of green ($G_i$) of each pixel or polygon by the $G_{ref}$, estimating yield loss (YL) using predetermined correlations with the Relative Green values, and constructing a yield loss map from the spatially referenced YL of each pixel or polygon. In addition, the Relative Green values may be used to estimate an optimal rate of rescue nitrogen fertilization that is spatially variable depending on the spatial distribution of the nitrogen status of crops throughout the field, and to construct a nitrogen fertilization map based on these estimated optimal nitrogen fertilization rates.

The aerial images of a field may be acquired when the crop, such as corn, is between the growth stages V8 and V18, with growth stages between V10 and V18 preferred. The aerial image may also be cropped to include only the fields of interest, with areas of high soil exposure eliminated.

BRIEF DESCRIPTION OF THE DRAWINGS

The inventive method may be employed to predict crop (especially corn) yield loss for nitrogen-deficiency due to low nitrogen fertilization rate at planting but no nitrogen loss in mid-season ("nitrogen-stress-no-nitrogen-loss"), or due to nitrogen loss caused by wet weather or other factors following sufficient nitrogen fertilization early in the season ("nitrogen-loss").

DETAILED DESCRIPTION

Figure 1:
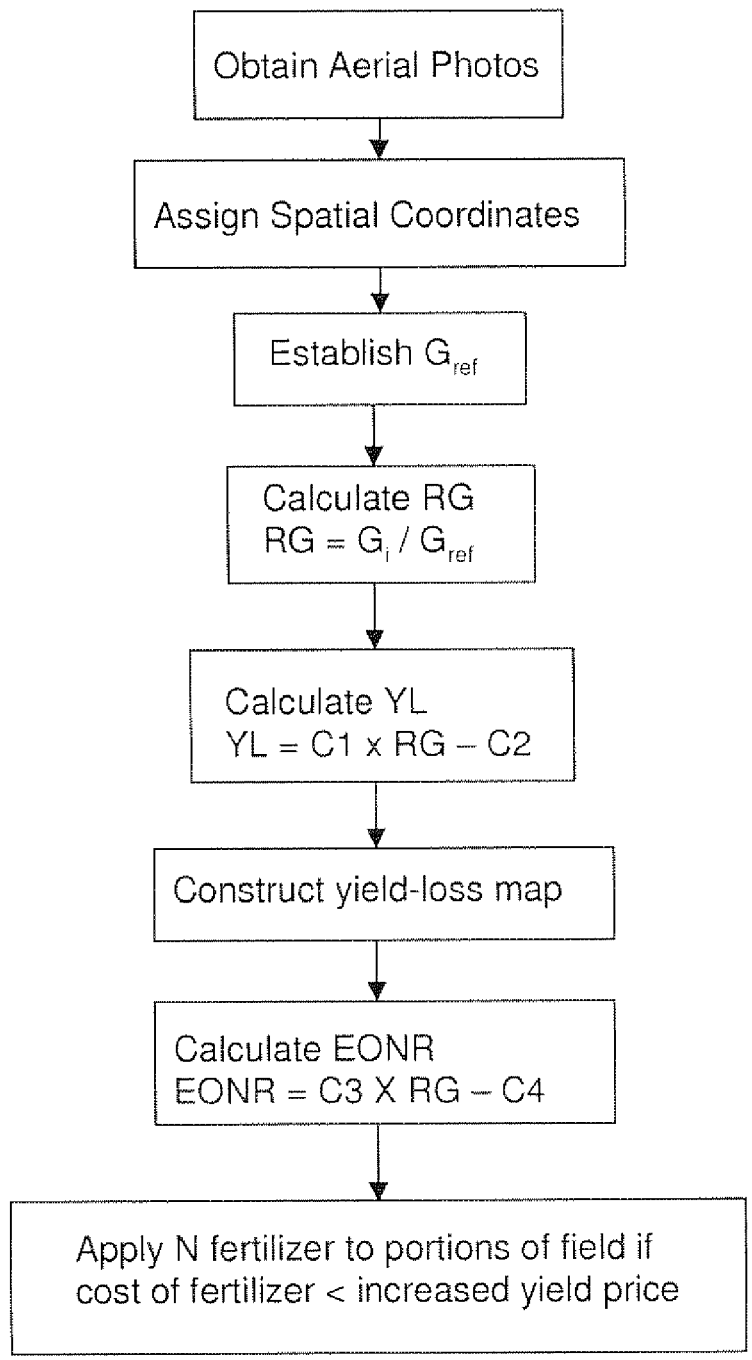
FIG. 1 is a flowchart illustration of the inventive method.

The present invention describes a method for determining nutrient deficiency and resulting crop yield loss using aerial photographs and positional data. In particular, the invention provides a method of determining corn yield loss due to nitrogen-deficiency using aerial photographs. In essence, the invention provides a method for estimating nitrogen deficiency in a field of crops, predicting the resulting loss of crop yield due to the nitrogen deficiency, and lastly providing information to help the producer to determine whether additional nitrogen fertilization would be economically profitable. A flowchart showing the steps comprising the inventive method is shown in FIG. 1.

After obtaining high-resolution digital aerial photographs of a field or fields of interest, spatial coordinates are assigned to the aerial image using the spatial coordinates of reference landmarks shown in the aerial photos. The aerial image is subdivided into one or more polygons. Within each polygon, the green color intensity of each pixel is averaged to determine the mean green pixel intensity for each polygon. The reference green pixel value ($G_{ref}$) for each field is then determined by averaging the darkest 20% of the mean values of green pixel intensity among all of the polygons in that field. Once the field's $G_{ref}$ has been established, the Relative Green (RG) values of each pixel or polygon are obtained by dividing the value of green ($G_i$) of each pixel or polygon by $G_{ref}$. An estimated yield loss is then calculated using a correlation of yield loss as a function of RG that was predetermined using previously measured empirical data. Lastly, the YL values for each polygon are mapped onto the original aerial image coordinates, resulting in a yield loss map of the field. An economic analysis can then be provided as to whether to add nitrogen to the field or a portion thereof, based on the price of the crop, the amount of crop lost, and the cost of nitrogen fertilization.

Acquisition and Processing of High Resolution Images of Fields

Remote sensing data may be collected using a variety of instruments selected from the list comprising aircraft mounted camera, satellite-mounted camera, camera mounted on a tower or depressed area of the field, and combinations thereof. The altitude and camera focal length used to capture the field images are selected to capture the largest possible image of the field that is possible within the field of view of the camera, in order to maximize the resolution of the resulting image. For best results, the resolution of the resulting digital images falls in the range between about 0.1 m/pixel and about 5 m/pixel, and more preferably between about 0.2 and 2 m/pixel, and most preferably about 0.5 m/pixel. Alternatively, digital field images may be obtained from agricultural or meteorological databases operated by governmental or commercial entities. For cornfields, the aerial image of one or more fields of interest may be acquired when the crop is between the stages V8 to V18, and more preferably between the stages V10 to V18. Growth stage V8 occurs about 4 weeks after the emergence of the corn from the soil; the corn plant at stage V8 has grown to approximately 50% of its full height. Growth stage V18 occurs when the corn plant has grown to its full height and just before the plant enters into the reproductive stage.

Optionally, the aerial image may be cropped to include only the one or more fields of interest with field boundaries and eliminating areas of high soil exposure identified by the operator or using automated image-processing rules defined below. Image cropping may be performed either before or immediately following the spatial assignments. In many cases, it is preferable to crop the image to include only one field, or two adjacent fields, and repeat as needed to analyze all fields of interest. However, if there is insufficient information to determine $G_{ref}$ during image analysis, such as the absence of a pre-established reference area, or alternatively a sufficient number of fields lack the minimum number of nitrogen-sufficient regions to serve as reference areas, then cropping the image to include multiple fields may be preferable in order to establish a reliable estimate of $G_{ref}$.

Field boundaries are defined in the aerial photos using methods selected from the list comprising: using stored files such as shapefiles, that define previously-established field boundaries to define the current field boundaries, or using an image analysis program to identify the field boundaries using a marking tool. Once the field boundaries are established, image pixels or polygons within the field boundaries are selected for analysis, and all other pixels falling outside the field boundaries are discarded. Many image-analysis programs, such as the Environment for Visualization of Images program (ENVI), possess tools to create image subsets, such as a Regions of Interest (ROI), based on the established field boundary lines.

The presence of bare soil in the aerial image may distort estimates of crop health and projected crop yield, so that the pixels corresponding to bare soil may be identified and removed using a number of techniques. A user may visually identify and manually remove the pixels corresponding to bare soil using existing image-processing software. Alternatively, the elimination of bare soil from the aerial image may be accomplished by discarding pixels in which the ratio of green/red color values falls within the ranges of values selected from the group comprising: a green/red color ratio of less than 1.1, or a green/red color ratio that is less than a green/red color ratio measured from bare soil in the same image when possible. In images that include near-infrared color values, the elimination of bare soil from the aerial image may be accomplished by discarding pixels with Normalized Difference Vegetation Indices that fall below a threshold value.

Assignment of Spatial Coordinates to Digital Field Images

Several well-established techniques are available to accomplish the spatial assignment of an aerial image. The spatial coordinates of an aerial image may be arbitrarily assigned based on the relative orientations between the pixels (or polygons) of the image, regardless their latitudes or longitudes. An aerial image of interest may be georeferenced to reflect the real world latitudes and longitudes of the image. Georeferencing may be accomplished during image acquisition, added to the image using reference points from standard images (Digital Ortho Quarter Quadrangles, for example) or using landmarks in the image whose position is known or measured. Any of these techniques is acceptable so long as the accuracy of the spatial coordinates assigned is appropriate for the desired end use of the digital images. Once spatial coordinates are assigned to the digital image, each pixel or polygon will be associated with a unique value for location (latitude and longitude, or other alternative representations of location) and will additionally be associated with one or more values for color intensity.

Determination of $G_{ref}$ and Calculation of Relative Greenness (RG)

The reference value of green corresponding to a section of field that is growing with ample available nitrogen ($G_{ref}$) is the benchmark for all green measurements, and all pixel measurements of green color intensity are expressed as a fraction of the reference value of green. $G_{ref}$ may be established by fertilizing a reference area of crop with a high rate of nitrogen early in the season, recording the area location, and identifying the area on the corresponding aerial image. $G_{ref}$ may also be calculated as the average green value of all pixels or polygons contained in the reference area. Alternatively, the green color values of all pixels or polygons in the one or more fields of interest may be sorted from low (dark green) to high (light green), and $G_{ref}$ may be calculated as the mean or median green value of the pixels or polygons falling below the darkest 20% (lowest green values) of all pixels or polygons, or $G_{ref}$ may be calculated as the mean or median green value of the pixels or polygons falling in the range between the darkest 10% and the darkest 20% of all pixels or polygons (lowest green values). Other methods could likely be used as long as a standard $G_{ref}$ is established.

Thus, for each field, the relative value of greenness (Relative Green or RG) of each pixel or polygon in the one or more aerial images is calculated by dividing the value of green ($G_i$) of each pixel or polygon by $G_{ref}$.

Determination and Mapping of Yield Loss (YL)

The method described by the present invention is employed to predict crop yield losses due to nitrogen-deficiency stemming from causes such as low nitrogen fertilization rate with no mid-season loss of nitrogen ("nitrogen-stress-without-nitrogen-loss"), or sufficient nitrogen fertilization early in the season with subsequent nitrogen loss caused by wet weather or other factors ("nitrogen-loss").

Yield loss (YL), the predicted decrease in crop productivity (in bushels per acre) due to nitrogen deficiency, is calculated by substituting the Relative Green (RG) value for each pixel or polygon of the Relative Green map into the linear relation:

$$YL = C_1 \times RG - C_2 \qquad \text{Eq. (1)},$$

where $C_1$ is the slope and $C_2$ is the intercept of a linear fit of measured corn yield data (see Example 1), and both $C_1$ and $C_2$ assume different values depending on the cause of the nitrogen-deficiency. If leaching or denitrification in the soil causes the nitrogen-deficiency ("nitrogen-loss"), $C_1$ is set to be approximately equal to $C_2$ and both $C_1$ and $C_2$ range between about 75 and about 100, and more preferably between about 85 and about 90. For the case of nitrogen-deficiency caused by low initial nitrogen-fertilization rates ("nitrogen-stress-without-nitrogen-loss"), the difference between $C_1$ and $C_2$ of the aforesaid equation is about 20, $C_1$ ranges between about 120 and about 160, and $C_2$ ranges between about 110 and about 150.

The invention calculates yield losses for the areas represented by pixels, as well as or for larger areas created by aggregating pixels into polygons. In the latter case, the yield loss of each polygon is calculated by substituting the average of the relative green (RG) values of all pixels within the polygon into Eq. 1.

Yield losses for each pixel or polygon are mapped onto the aerial image using the paired yield loss and spatial location values stored for each pixel. The resulting yield loss map helps the producer determine the predicted yield of the fields, and the location of any rescue nitrogen-fertilizations that may be required.

Determination and Mapping of Economically Optimal Nitrogen Fertilization Rate

In the case of low initial nitrogen fertilizer rate ("nitrogen-stress-without-nitrogen-loss"), an economically optimal nitrogen rate (EONR) may be calculated by substituting the RG value for the pixel or polygon into the following linear transformation:

$$EONR = C_3 \times RG - C_4 \qquad (Eq. 2),$$

where $C_3$ is the slope and $C_4$ is the intercept of a linear fit of empirical data, using a method similar to the method used to determine the values of $C_1$ and $C_2$ (see Example 1). The value of $C_3$ is set to be higher than $C_4$ by a difference ranging between about 20 and about 60. The value of $C_3$ ranges between about 300 and about 400, and the value of $C_4$ ranges between about 250 and about 350. The empirical data used to establish this linear transformation were collected from 23 small plot experiments in farmer fields in Missouri.

In addition, the EONR and spatial location data stored with each pixel or polygon may be used to construct an EONR map to provide a producer or other user with information on an estimated minimum amount of nitrogen fertilizer to use in the midseason application in order to minimize the predicted yield losses and recover the revenue that would have otherwise been lost due to a decrease in overall crop yield. Thus, the precise amount of additional nitrogen fertilizer needed to realize the maximum potential crop yield may be determined from the EONR map.

The information contained in the yield loss map and the information contained in the EONR map may be combined to facilitate the management of nitrogen fertilizer. The total cost of additional nitrogen fertilization may be easily determined because the exact amount and location of fertilizer application is provided. Given additional information about the value of the crop, the economic loss incurred by yield loss if additional nitrogen fertilizer is not provided may also be determined. If the potential increase in the value of the harvest exceeds the expense of additional nitrogen fertilization, the producer would realize a net economic gain by fertilizing. In addition, because the information is provided as spatially mapped information, the producer is provided with the necessary information to perform a similar economic analysis on subsets or sub-regions of the crop field.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

EXAMPLES

The following examples illustrate the invention.

Example 1

Development of Method to Estimate Yield Losses from Aerial Photographs

To develop and test a method to estimate corn yield loss due to nitrogen deficiency, the following experiment was conducted. Based on the hypothesis that the areas of cornfields experiencing higher nitrogen loss would appear lighter in aerial photographs and produce lower yields, aerial photographs of seven cornfields that had received above-average May and June rainfall were analyzed as described below.

Selection and Characteristics of Experimental Fields: Seven study fields were located in four counties in the northern half of Missouri, spread over a distance of 270 km, and represented a moderate range of geographies, landscape positions, soil genesis factors, and surface soil textures (see Table 1). All seven fields had uniform fertilization histories. All fields were located in regions that received higher-than-average precipitation in May and June, and therefore had a high potential for nitrogen losses due to leaching and denitrification losses. The fields used in this experiment were selected based on the determination of potential nitrogen deficiency by cooperating producers.

TABLE 1

Information on seven production cornfields photographed in 2001 and 2004.

| Field | Year | Soil region | Soil great group | Surface soil texture | Photo resolution (m/pixel) | Area (ha) | Polygon size ($m^2$) | Polygon count |
|---|---|---|---|---|---|---|---|---|
| AL1 | 2004 | Alluvial | Hapludolls* | Silty clay | 2.00 | 41.8 | 16 | 13899 |
| AL2 | 2004 | Alluvial | Endoaquerts* | Clay | 2.00 | 27.0 | 16 | 9686 |
| AL3 | 2001 | Alluvial | Endoaquolls* | Silty clay | 1.00 | 2.3 | 9 | 1562 |
| CP1 | 2001 | Claypan | Epiaqualfs | Silty loam | 0.54 | 7.4 | 10 | 5421 |

TABLE 1-continued

Information on seven production cornfields photographed in 2001 and 2004.

| Field | Year | Soil region | Soil great group | Surface soil texture | Photo resolution (m/pixel) | Area (ha) | Polygon size (m²) | Polygon count |
|---|---|---|---|---|---|---|---|---|
| CP2 | 2001 | Claypan | Albaqualfs | Silty loam | 0.56 | 6.3 | 21 | 1468 |
| CP3 | 2001 | Claypan | Epiaqualfs | Silty loam | 0.42 | 8.7 | 21 | 2103 |
| CP4 | 2001 | Claypan | Epiaqualfs | Silty loam | 0.42 | 5.6 | 21 | 1401 |

*All three alluvial fields contained map units representing more than one great group. The primary great group was listed and made up between 60% and 70% of the field area. Secondary great groups, by field, were: AL1, Endoaquerts; AL2, Hapludolls; AL3, Udifluvents.

Aerial Photograph Acquisition, Digitization, and Rectification: Aerial photographic images were acquired from five production cornfields in 2001 and two production cornfields in 2004. Aerial photographs in 2001 were taken from small-plane flyovers in a nadir (straight down) orientation at altitudes ranging from 1000-1400 m above ground level using ASA 400 35 mm color positive film. Larger fields were photographed from higher altitudes to fit the whole field onto the camera's field of view. Photos were obtained on 5 Jul. 2001, and the growth stage of the corn at that time was approximately V11 to V13. The film was processed into color slides, and then digitized using a Nikon CoolScan 1.05 film scanner (Nikon, Inc., Melville, N.Y.). The spatial resolution of the digitized images ranged from 0.42 to 1.00 m per pixel (see Table 1), depending on differences in the altitudes at which the aerial photographs were obtained and differences in the focal length used by the camera to obtain the aerial photographs. Using the Environment for Visualizing Images (ENVI) software version 3.5 (Research Systems, Inc., Boulder, Colo.), the aerial photos were rectified and formatted to the Universal Transverse Mercator coordinate system that incorporated the North American Datum of 1983 (NAD83), using coordinate points collected from Digital Ortho Quarter Quads produced by the U.S. Geological Survey and obtained from the map room of the Center for Agricultural, Resource, and Environmental Systems (http://cares.missouri.edu/index.asp). Georeferenced digital aerial photographic images for the two additional fields, acquired on 24 Jun. 2004 at an estimated corn growth stage of V10 to V11, were obtained from the National Agricultural Imaging Program (Farm Service Agency, U.S. Dept. of Agriculture). These additional aerial images had a spatial resolution of 2 m per pixel with 10 m stated accuracy.

Yield Monitor Data Associated with Image Data: Maps of corn grain yield were obtained from the producers and processed using Spatial Management System Basic (Ag Leader Technology, Inc., Ames, Iowa). The location of each reported corn grain yield was used as the centroid for a rectangular polygon in the rectified aerial photographic images. "Closed" blanking (BLN) files, containing the coordinates of the vertices of the closed rectangular polygons, were constructed using Microsoft Excel (Microsoft Corp., Redmond, Wash.), imported as text files into Surfer 7.0 (Golden Software, Inc., Golden, Colo.), exported as shapefiles into ENVI 3.5, and used as Regions of Interest in the rectified images. The Regions of Interest were used to extract and export mean digital counts (DCs) for red, green, and blue wavelengths, as well as the associated geographic map coordinates for each polygon. Yield data and mean red, green, and blue DCs for each polygon were merged using SAS version 8.2 (SAS Institute, Cary, N.C.).

Aerial Image Processing: Several photographs contained areas of low vegetative cover, which were removed from the analysis to reduce errors in the appearance of the crop. All polygons with a green/red pixel color ratio of less than 1.2 were removed from the analysis, using a decision rule developed using previously acquired photographs of corn fields with high resolution (~4 cm) and low vegetative cover. Using this procedure, no polygons were eliminated from the A3 and CP2 fields. The CP3 and CP4 fields had 15% and 55% of the polygons removed, respectively, which were in areas identified by the cooperating corn producer as having severe black cutworm [*Agrotis ipsilon* (Hufnagel)] damage. The A1 and A2 fields had 17% and 15% of the polygons removed, respectively, mainly in areas identified by the cooperating corn producer as drainage channels. The CP1 field had 23% of the polygons removed, mainly at one end of the field that was identified by producers as suffering substantial stand loss due to excess rainfall and subsequent seedling disease.

Aerial Photographic Image Data Processing: The post-processing of the digitized aerial photographs focused on the green pixel values relative to a reference green value, based on previous research that indicated that the plant's nitrogen status was more closely related to green reflectance than to red or blue reflectance, and additional previous research that suggested that relative color from aerial imagery was a more accurate and reliable indicator of nitrogen status than absolute color. The reference green DC ($G_{ref}$) for each field's photographic image was set equal to the mean green DC from the darkest (lowest green DC) 20% of polygons, and represented those areas with sufficient availability of nitrogen, and the relative green (RG) value for each polygon was then calculated as the green DC for each polygon divided by the reference green DC.

In order to compare color-yield relationships across multiple fields, a reference yield value for each field was used to normalize the expression of yield. Reference yield was defined as the average yield for the same polygons (i.e. the darkest 20%) used in establishing the reference green value. The relative yield for each polygon was calculated by dividing each polygon's yield by the reference yield, and yield loss was calculated by subtracting the reported yield for each polygon from the reference yield.

Polygons in each digitized aerial image were grouped by relative green value into classes with a constant interval of relative green value (<1.00, 1.01 to 1.05, 1.06 to 1.10, 1.11 to 1.15, 1.16 to 1.20, etc.). All data associated with each polygon were aggregated into each of the classes, and mean values for relative green, relative yield, and yield loss were calculated for each class. Class means for relative yield and yield loss were regressed against class means for relative green using SAS software version 8.2 (SAS Institute, Cary, N.C.).

Figure 2:
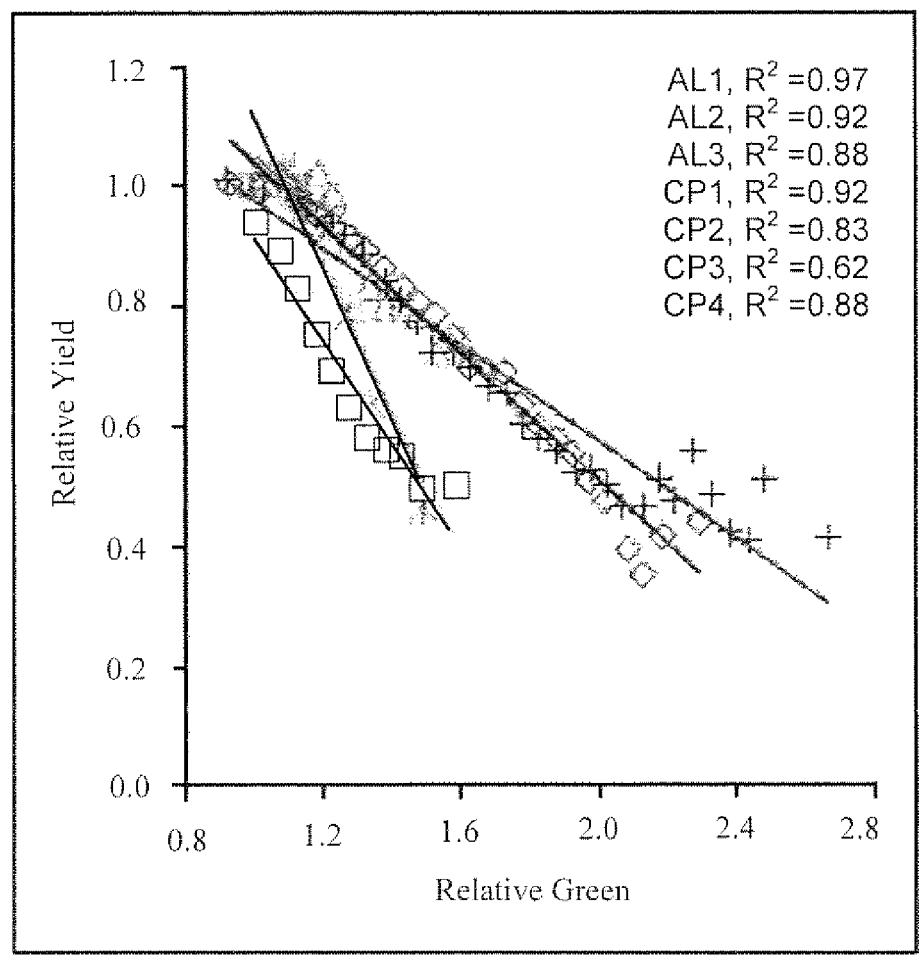
FIG. 2 illustrates the relationship between relative yield and relative green from individual fields.
Figure 3:
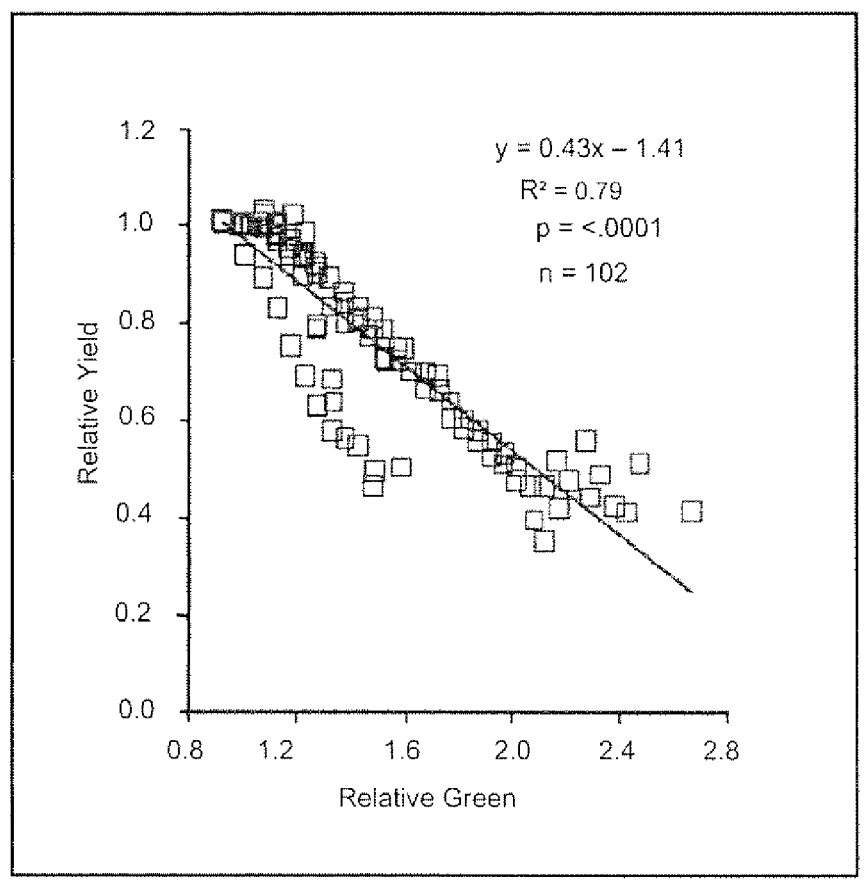
FIG. 3 illustrates the relationship between relative yield and relative green from combined data across all seven fields.

Relationship Between Aerial Photographic Data and Crop Yield: In each of the seven study fields, relative yield decreased significantly (P<0.002 in each field) as relative green increased, shown in FIG. 2. This observation was consistent with the hypothesis that lighter areas (with higher green DC and relative green values) had experienced nitrogen loss, which subsequently limited corn yield. The strength of the relationship was related to the degree of nitrogen stress, as assessed by the observed range of either relative green or relative yield. Coefficient of determination ranged from 0.62 in the field with the least nitrogen stress to >0.9 in the three fields with the most nitrogen stress. Within each relative green class, there was often considerable variability in relative yield that could be attributed to other landscape and management factors. In aggregate, however, this variability did not mask the effects of nitrogen on yield potential, suggesting that nitrogen was a major factor limiting yields in these fields. The relationship between relative green and relative yield was similar among all fields, though the CP1 and CP4 fields had steeper slopes than other fields (P=0.011 and 0.0005, respectively, using a test for equality of slope between individual locations vs. all locations combined). The observed similarities between fields suggested that a general relationship, shown in FIG. 3, could be used to predict relative yield from future aerial photographs with reasonable accuracy and reliability ($r^2=0.79$).

Figure 4:
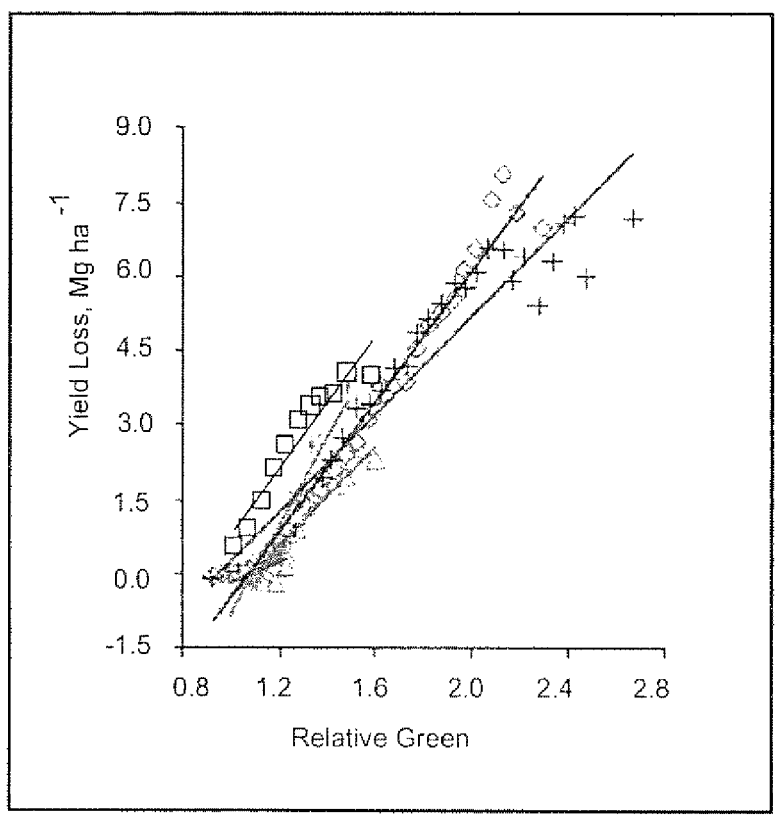
FIG. 4 illustrates the relationship between yield loss and relative green from individual fields.
Figure 5:
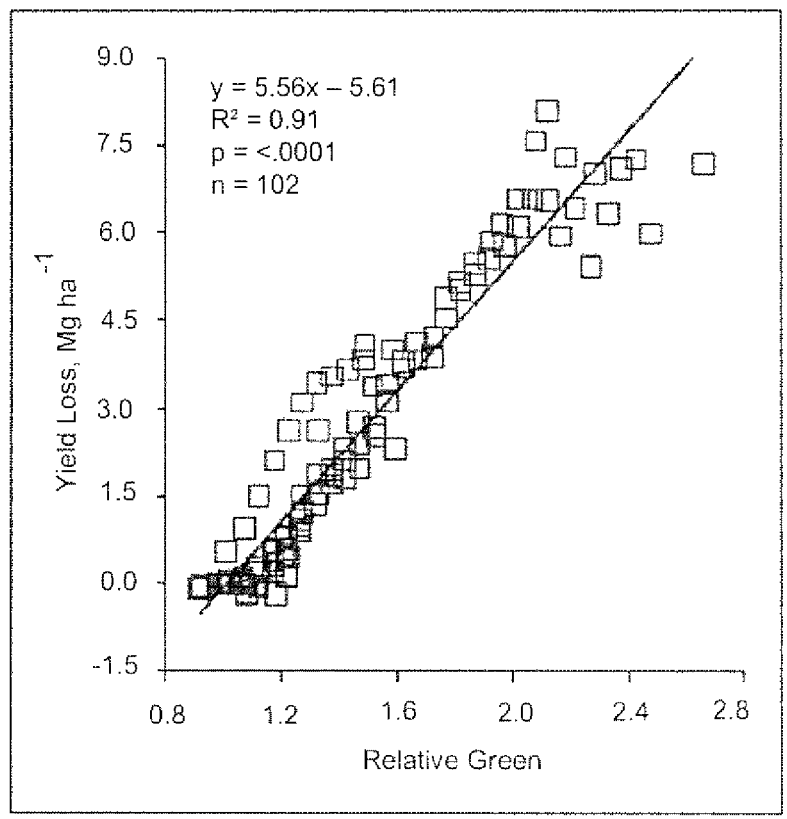
FIG. 5 illustrates the relationship between yield loss and relative green from combined data across seven fields.

Relative greenness was also related to yield loss in each study field, and summarized in FIG. 4 (P<0.002 in each field except CP3, where P=0.12). As with relative yield, coefficient of determination was lowest in the field with the least nitrogen stress and highest in the fields with the most nitrogen stress. The similarity of this relationship across fields was even more striking than for the relationship between relative greenness and relative yield. When data from all fields were combined to form a general relationship, as shown in FIG. 5, the coefficient of determination was 0.91, which suggested that potential yield loss can be estimated with good accuracy from aerial photographs for cases of nitrogen loss.

When data were standardized to reference values for each field and combined, relative green predicted relative yield with $r^2=0.79$ and yield loss with $r^2=0.91$. Aerial photos provided reasonable predictions of yield loss due to nitrogen deficiency. These predictions may help corn producers decide how much expense and trouble is justified in making rescue nitrogen applications, and additionally may permit large-scale evaluation of the susceptibility of different nitrogen fertilizer management strategies to address nitrogen loss.

Example 2

Aerial Photo Data Used to Manage Nitrogen Supplementation

Figure 6:
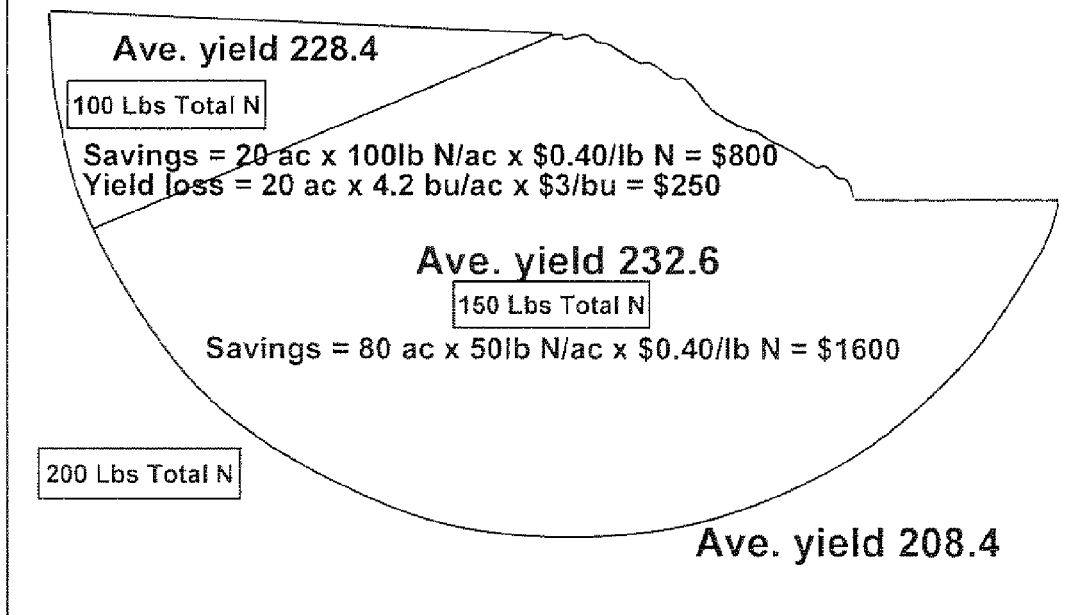
FIG. 6 is a summary of the crop yield resulting from nitrogen fertilization management informed by an assessment of crop nitrogen deficiency using aerial photographic data.

To demonstrate the feasibility of using aerial photo data to assess crop health and to determine the appropriate rates of nitrogen supplementation, a demonstration project was established in 2006. This project used data obtained from aerial photos using the methods described in Example 1 to guide nitrogen fertilizer application through a center-pivot irrigation system, as illustrated in FIG. 6. In this demonstration project, the normal pre-planting nitrogen application was reduced by 50%, and aerial photographs were used to diagnose the additional nitrogen application rate needed for 150 pivot-irrigated acres. Based on the fertilization rate determined by the methods described in Example 1, nitrogen fertilizer use was reduced by 8500 lb of nitrogen (28,000 lb nitrogen fertilizer solution), or 28% of the normal nitrogen application rate. This recommended nitrogen fertilization rate resulted in a modest 84 bu loss in corn yield, or 0.25% of the field's total yield. Results from the south field of this demonstration project are shown in FIG. 6.

Example 3

Nitrogen Management Methods Using Aerial Photo Data May be Used to Manage Nitrogen Fertilization Rates on Experimental Survey Areas To refine the relationship between aerial photo data and corn yield loss developed using the methods described in Example 1, three experimental survey areas of 1200 to 2000 acres were established in the Missouri River bottom of Holt County, Mo., which received excessive rainfall in April and May 2005. Based on the predictive relationship developed in Example 1, aerial photographs were used to predict an average of 25 bu/acre lost yield potential over the survey areas due to nitrogen deficiency. Extrapolated over the whole Missouri River bottom in Holt County, this amounted to 1.8 million bushels of lost corn yield in 2005, or about $3.6 million of lost income. Working with community agronomists and individual producers to collect nitrogen fertilizer management information for these fields, different nitrogen fertilizer sources and multiple application methods may be compared to determine which strategies are most successful at preventing nitrogen loss.

REFERENCES

Ritchie, Steven W., John J. Hanway, and Garren O. Benson. 1993. How a corn plant develops. Special report number 48. Iowa State University, Ames, Iowa.

We claim:

1. A method of determining a nitrogen fertilization rate of a crop field at mid-season to ameliorate nitrogen deficiency using a spatially referenced map of relative green values (RG), wherein each RG comprises the reflectivity of green light at a location in a canopy of the crop field relative to a reference RG, the method comprising:
 a. estimating an economically optimal nitrogen rate (EONR) corresponding to each RG of the spatially referenced map by substituting each RG into the equation $EONR = C_3 \times RG - C_4$ wherein $C_3$ and $C_4$ are empirically derived constants; and
 b. mapping each EONR corresponding to each RG onto a spatially referenced EONR map;
 wherein each EONR comprises a recommended amount of nitrogen per unit area to be applied at mid-season in order to minimize a predicted crop yield loss due to nitrogen deficiency.

2. The method of claim 1, wherein the crop field is a corn field initially fertilized with an insufficient amount of nitrogen, ($C_3$-$C_4$) ranges from about 20 to about 60, $C_3$ ranges from about 300 to about 400, and $C_4$ ranges from about 250 to about 350.

3. The method of claim 1, wherein each EONR comprises a recommended amount of nitrogen per unit area to be applied at mid-season in order to maximize a predicted potential crop yield.

* * * * *